United States Patent [19]

Walker

[11] Patent Number: 4,962,609
[45] Date of Patent: Oct. 16, 1990

[54] FISH ATTRACTANT SCENTED FISHING LURE

[76] Inventor: Russell D. Walker, Box 1502, Enid, Okla. 73702

[21] Appl. No.: 445,252

[22] Filed: Dec. 4, 1989

[51] Int. Cl.$^5$ .............................................. A01K 85.01
[52] U.S. Cl. .................................................... 43/42.06
[58] Field of Search ................. 43/42.47, 42.06, 42.48, 43/42.24

[56] References Cited

U.S. PATENT DOCUMENTS

| | | | |
|---|---|---|---|
| 2,216,929 | 10/1940 | Zander et al. | 43/42.24 |
| 2,745,206 | 5/1956 | Gaw | 43/42.48 |
| 4,709,499 | 12/1987 | Ottaviano | 43/42.06 |
| 4,736,542 | 4/1988 | Floyd | 43/42.06 |

FOREIGN PATENT DOCUMENTS 8907393  8/1989  Int'l Pat. Institute ............. 43/42.06

Primary Examiner—Richard K. Seidel
Assistant Examiner—James Miner
Attorney, Agent, or Firm—Robert K. Rhea

[57] ABSTRACT

A scent omitting fish-shaped fishing lure having a rigid body portion provided with recesses on its opposite sides filled with a layer of fibrous material. The fibrous material when impregnated with a fish attracting substance and placed in the water gradually disperses the fish attracting substance into the water as the lure is moved in a forward direction.

1 Claim, 1 Drawing Sheet

FISH ATTRACTANT SCENTED FISHING LURE

BACKGROUND OF THE INVENTION

1. Field of the Invention.

This invention relates to a fishing lure which disperses a fish attractant substance as it is moved through the water. Fishermen have frequently used bait which emits an odor attractive to certain fish. It has been found that liquid fish attractant substances are also conducive toward attracting fish to a certain location and or lures. However, there is the problem of being able to maintain the fish attractant in the water being fished. If the fish attractant is oil based and it is poured on the surface of the water, it mostly remains on the surface as a result of the difference in specific gravity. Water based fish attractants are dispersed so quickly that the fish are not drawn to a particular area or lures.

This invention provides a lure consistently emitting a fish attractant substance as it is drawn through the water for an extended period of time.

2. Description of the Prior Art.

Prior patents generally disclose a fishing lure formed from fibrous material which is impregnated with a fish attracting substance such as U.S. Pat. No. 4,736,542. However, the principal difficulty with devices of this type is impregnating the fishing lure body with the fish attractant substance.

This invention is distinctive over this and other similar fish attractant emitting fishing lures by providing a fibrous material which absorbs the fish attractant substance by the fibrous material being disposed in a recess in the fishing lure body which contains the fishing lure substance when poured there on until it is fully absorbed in the several fibers of the material. The lure with fish attractant impregnated fibrous material when drawn through a body of water gradually releases the fish attractant substance over an extended period of time.

SUMMARY OF THE INVENTION

A fish imitating rigid body is characterized by a forward and downwardly projecting spoon-like fin tending to divert the lure in opposing directions as it is drawn through the water. The lure body is provided on its respective longitudinal side surfaces with an indentation or recess of a selected depth. These recesses are each filled with a layer of fibrous material, either natural or synthetic fibers on a backing sheet bonded the surface forming the respective recess.

The principal object of this invention is to provide a fish imitating rigid body having recesses receiving a layer of fibrous material for retaining a quantity of fish attractant substance for gradually emitting the latter into a body of water as the lure is being used in fishing in a conventional manner.

DESCRIPTION OF THE PREFERRED EMBODIMENTS

Figure 1:
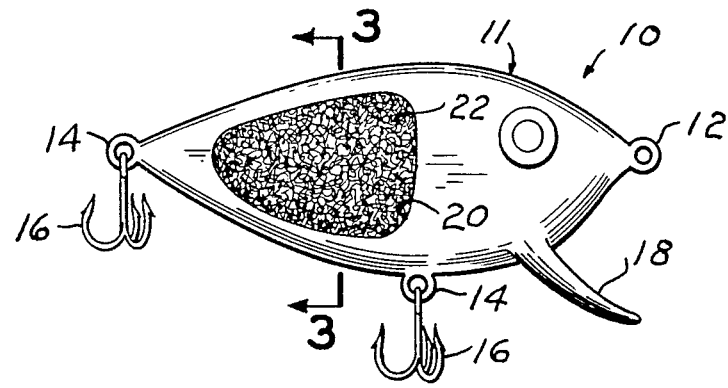
FIG. 1 is a side elevational view of the fishing lure.
Figure 2:
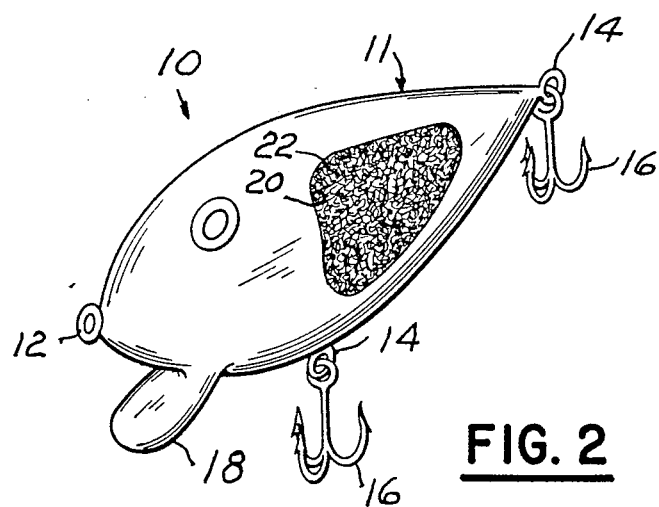
FIG. 2 is a perspective view of the lure from its forward end.
Figure 3:
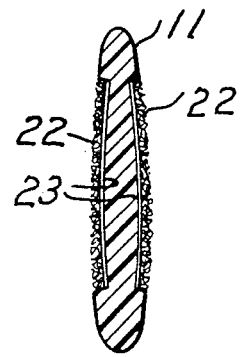
FIG. 3 is a vertical cross sectional view taken substantially on the line 3—3 of FIG. 1.

Like characters of reference designate like parts in those figures of the drawings in which they occur.

In the drawings:

The reference numeral 10 indicates the fishing lure as a whole having a body 11 which is generally fish shaped in overall configuration having a forward end provided with a line receiving loop 12 and other loops 14 having fish hooks 16 connected thereto.

The lure body 11 further includes a downward and forwardly projecting spoon-like fin 18 depending from its forward end portion. Opposing sides of the fishing lure body 11 are recessed as at 20 encompassing the major portion of the lateral sides of the body 11 rearwardly of its medial portion. These recesses 20 are each filled with a layer of closely knit fibrous material 22 bonded to a backing sheet in turn bonded to the surface defining the respective recess. The fibers of the fibrous material may be synthetic fibers or natural fibers such as wool.

OPERATION

In operation the lure 10 is disposed on one of its sides with one of the fiber filled recesses facing upwardly. A fish attractant substance in liquid form, not shown, is then poured or otherwise applied to the fibrous material. Excess attractant substance is retained in place by the several fibers and the walls forming the recess 11 until the fibrous material is completely soaked or impregnated with the fish attractant substance. As the fish attractant substance is progressively absorbed by the fibrous material, additional fish attractant substance is added to that side being charged with the fish attractant material. After loading one fibrous surface with the fish attractant substance the lure 10 is reversed, that is its opposite is disposed upwardly and the above steps of impregnating the fibrous material with the fish attractant substance is repeated. Thereafter, the fishing lure is ready for use in fishing in a conventional manner.

Obviously the invention is susceptible to changes or alterations without defeating its practicability. Therefore, I do not wish to be confined to the preferred embodiment shown in the drawings and described herein.

I claim:

1. A fishing lure, comprising:
    a fish imitating body shape characterized by a forward and downwardly projecting spoon-like fin,
    each side surface of the fish-shaped body having a single recess encompassing the major side surface area of the respective side of the fish-shaped body;
    a layer of natural or synthetic fibrous material filling the recess,
    said fibrous material having fibers capable of absorbing and temporarialy retaining fish attractant substance, whereby when said absorbant fibrous material is impregnated with fish attractant and drawn through prospective fishing waters the fish attractant material is gradually displaced by water while simultaneously dispersing the fish attractant, and,
    at least one fishhook attached to said fish-shaped body.

* * * * *